Dec. 14, 1937.  C. H. GIBERSON  2,101,937
SWIVEL PIPE JOINT
Filed July 30, 1937  2 Sheets-Sheet 1
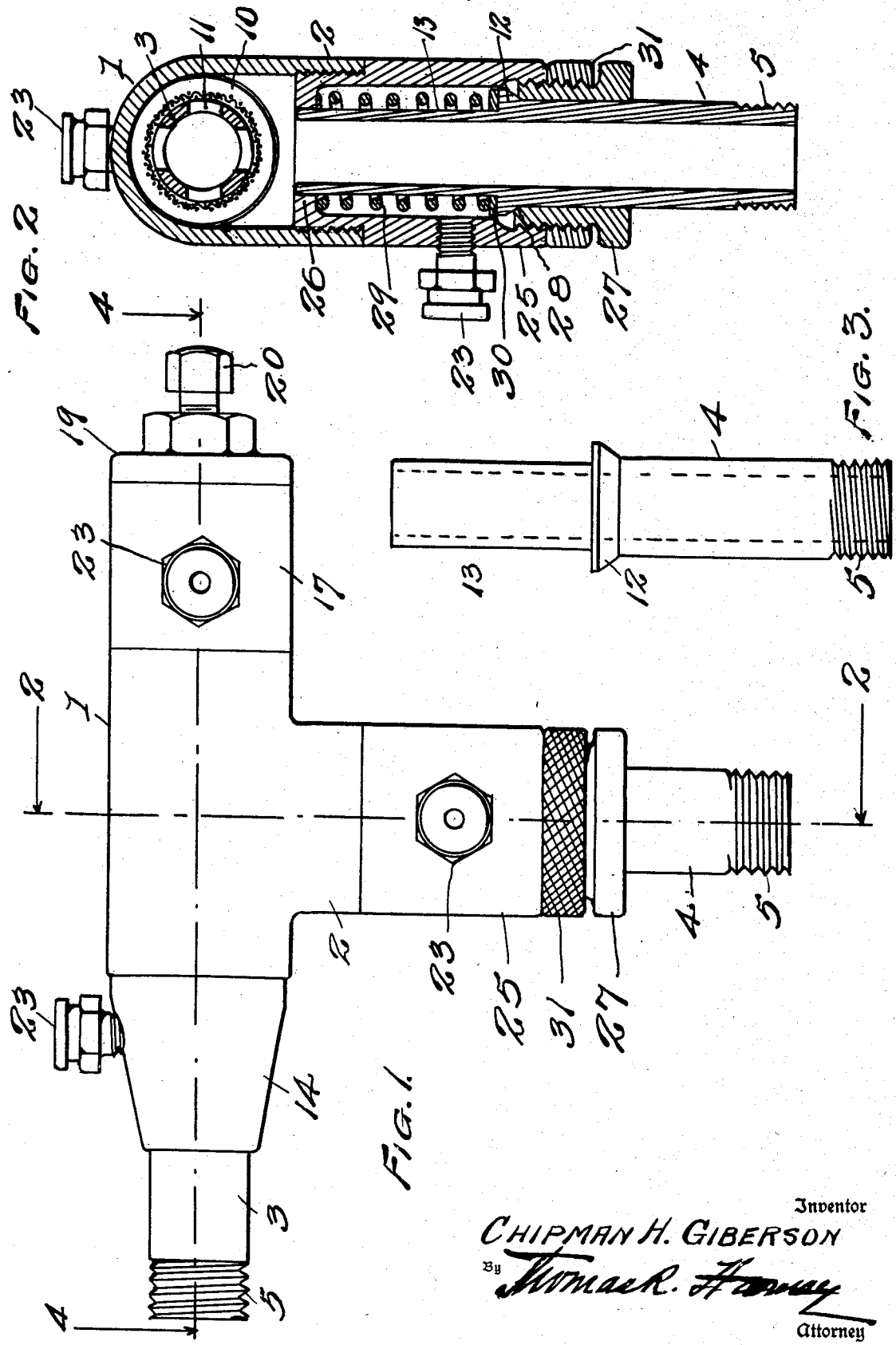
Inventor
CHIPMAN H. GIBERSON
By Thomas R. Harvey
Attorney Dec. 14, 1937.  C. H. GIBERSON  2,101,937
SWIVEL PIPE JOINT
Filed July 30, 1937  2 Sheets-Sheet 2
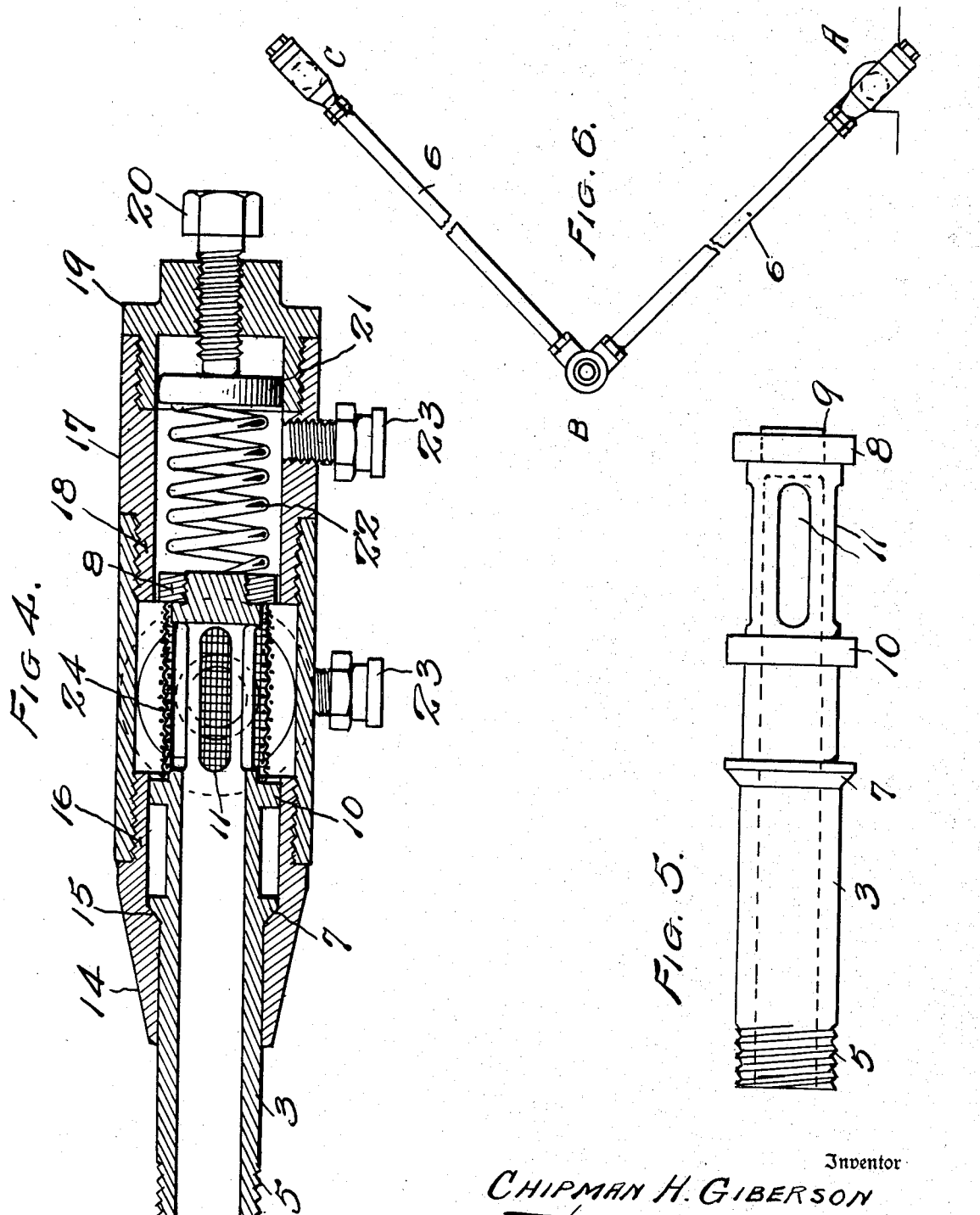
Inventor
CHIPMAN H. GIBERSON
By Thomas R. Harney
Attorney Patented Dec. 14, 1937

2,101,937

UNITED STATES PATENT OFFICE 2,101,937

SWIVEL PIPE JOINT

Chipman H. Giberson, Elyria, Ohio

Application July 30, 1937, Serial No. 156,589

3 Claims. (Cl. 285—9)

The present invention relates to improvements in swivel pipe-joints or swing-joints, for use in pipe-lines adapted to convey motive fluid under pressure as steam and air in power-lines; water in irrigation systems; and grease for lubrication purposes. The swivel joints are especially adapted for use with machines and machine tools, where the machine has oscillating or other relatively movable parts, or where the motive fluid is supplied to a portable machine tool.

In carrying out my invention I employ an angular pipe-joint having a double swivel including two journaled nipples, by means of which nipples the joint is interposed and connected in the pipe line, and the latter may be made up of either rigid pipes or flexible pipes or hose. In the embodiment of my invention I dispense with the use of the customary soft, compressible packing materials to prevent leaks, and I substitute therefor ground metal joints that are constantly seated and automatically adjusted to insure tight fit against leakage, and to insure durability and long wear for the swiveled parts of the joint. Means are also provided for automatically adjusting the joints to take-up or compensate for wear, and the parts are lubricated to insure smooth working of the joint parts.

The invention consists in certain novel combinations and arrangements of parts as will hereinafter be more fully set forth and claimed. In the accompanying drawings I have illustrated one completely example of the physical embodiment of my invention wherein the parts are combined and arranged according to one mode I have so far devised for the practical application of the principles of my invention, but it will be understood that various changes and alterations may be made within the scope of my appended claims without departing from the principles of my invention.

Figure 1 is a view of an angular pipe-joint embodying my invention.

Figure 2 is a vertical sectional detail view at line 2—2 of Figure 1.

Figure 3 is an exterior view of one of the nipples detached from the joint.

Figure 4 is a horizontal longitudinal detail view on the section line 4—4 of Figure 1.

Figure 5 is an exterior view of another of the nipples removed from the joint.

Figure 6 is a diagrammatic view illustrating the use of the joints in a pipe-line.

In the simplest and preferred form of my invention I utilize a T-coupling having the usual two cylinder portions 1 and 2, and the three ends of the T-coupling are internally threaded as shown. Two nipples, 3 and 4, which for convenience of illustration and description are referred to as horizontal and vertical nipples, respectively, are mounted at right angles and swiveled in the joint, and the outer ends of these nipples are externally threaded at 5 for connection with pipe sections 6, as seen in Figure 6.

In Figure 6 a diagrammatic arrangement of a jointed pipeline, as used on machines in a rubber factory, is illustrated, wherein the double swivel joint at A has a stationary support; the pipe line is hinged at B; and the joint C is free to swing on both the joints B and A.

The horizontal nipple 3, as seen in Figure 5 particularly, is fashioned with a tapered, exterior, annular flange or ring 7 that forms a head for one of the swivel joints within the device, and this nipple is also fashioned at its inner end, within the joint, with an enlarged bearing head 8 that may be threaded on the reduced solid end 9 of the nipple 3. A second bearing head 10 is also fashioned, preferably integral with the nipple between the packing head 7 and the bearing head 8, and between the two bearing heads a suitable number of longitudinally extending ports 11 are provided in the cylindrical wall of the nipple 3.

The vertical nipple 4 is also provided with a tapered, annular, exterior flange, as 12 to form a ground packing head, and the inner end 13 of this nipple 4 is fashioned with a reduced cylindrical end 13, as shown.

The outer threaded ends of the nipples to which the pipes 6 are connected, are of course open ends, but the inner end of the horizontal nipple 3 is closed, while the inner or upper end of the vertical nipple 4 is open to the interior of the joint.

The horizontal nipple 3 at the left end of the joint in Figs. 1 and 4 is partially enclosed within an exterior-tapered bushing 14, having an interior, annular tapered packing seat 15, and this bushing is attached to the cylindrical portion 1 of the T-coupling by means of an externally threaded flange 16 screwed into the complementary flanges of the coupling. The interior bore of the bushing is cylindrical; the tapered seat 15 is ground to receive the complementary tapered packing head 7 of the nipple; and the reduced, outer bore of the bushing fits neatly around the exterior of the nipple 3. The reduced bore of the outer end of the bushing forms a bearing for the nipple, and the enlarged bore at the inner end of the bushing forms a bearing for the bearing head 10 of the nipple, and it will be apparent that the nipple is not only journaled to swivel in the joint, but that it has a sliding fit also within the joint. These widely spaced bearings for the nipple provide a substantial support that prevents wobbling of the jointed parts, and the ground metal packing joint at 7—15 provides a sealed joint against leakage of the motive fluid passing through the joint.

The rear, or right, open end of the cylinder 1 of the T-coupling, is provided with a cylindrical sleeve 17 that is fashioned with a reduced externally threaded flange 18 screwed into the threaded end of the portion 1, and the outer open end of this sleeve is closed by means of a plug-nut 19. An adjustable bolt 20 is threaded longitudinally through the nut to bear against an adjusting disk 21, circular in shape, that is movable within the nut 19, and a spring 22 is interposed between this adjusting disk and the end-head 8 of the nipple 3. The spring provides resilient means for holding the tapered joint 7—15 in constantly packed condition, and the tension of the spring may be varied by turning the bolt 20 to take up wear, and to properly adjust the packed joint.

Grease for lubricating purposes is supplied to the interior of the angular joint by means of grease cups 23 located at appropriate places, to supply grease to the annular space between the two spaced heads 7 and 10 of the nipple 3, and to the spring chamber or compartment between the head 8 and the disk 21.

As indicated in Figure 4, the ported portion of the nipple 3, between the two heads 10 and 8, is normally located directly over the vertical or lower cylindrical portion 2 of the T-coupling, and the flow of motive fluid is upwardly through the nipple 4 in Figure 2, thence through the ports 11 of the nipple 3, and thence through the interior of the nipple 3 to the connected pipe. In some instances I provide a cylindrical screen 24 in the form of a perforated cylinder, around the ported part of the nipple 3, for use as a filter, especially when air is being conveyed through the joint as motive fluid.

As best seen in Figures 1 and 2, an upright sleeve 25 is threaded in the lower threaded end of the cylinder 2 of the T-coupling, and the upper, inner end of this sleeve is fashioned with an annular flange 26 to form a reduced-size bearing for the upper or inner end of the nipple 4, as indicated. A tubular nut 27 is threaded into the lower or outer end of the sleeve 25, and the inner end of this nut is fashioned with a beveled shoulder or interior annular tapered seat 28 to receive the tapered packing head 12 of the nipple 4. The packing head 12 is held in its seat 28 by means of the spring 29 that is interposed between the interior flange 26 of the sleeve 25, and a washer 30 bearing against the packing head 12 of the nipple 4, and a lock nut 31 is employed to lock the nut 27 in its adjusted position. The tension of the spring 29 may be varied by turning the nut 27 to take up wear between the head 12 and the seat 28, and to properly seat the head.

Like the nipple 3, the nipple 4 is also slidable longitudinally, against the tension of its spring, in the joint, and the nipple 4 is swiveled or journaled in widely spaced bearings to prevent wobbling of the nipple. At the upper inner end of the nipple 4 it is journaled within the flange 26 as a bearing, and the nut 27 having a snug fit about the exterior of the nipple, also provides a journal bearing for the swiveled nipple. The spring chamber formed between the annular flange 26 and the washer 30 on the head 12 is also supplied with lubricating grease by means of a grease cup 23 threaded through the wall of the sleeve 25.

From the above description taken in connection with my drawings it will be apparent that I have provided a double swivel angular joint for pipe lines that is made up of a comparatively small number of parts readily assembled, to provide a device that is simple in both construction and operation, and well adapted for uses previously stated.

While I have shown in Figure 6 two angular joints at the outer ends of two hinged pipe-sections as illustrating the use of the swivel or swing-joint, it will of course be understood that a single angular joint may be employed for certain uses. Further, it will be understood that while, for identification purposes, I have referred to the nipples as being in horizontal and vertical planes, these nipples 3 and 4 may be connected to rigid pipe-sections or to flexible pipe-sections, and to stationary supports as well as portable or movable supports, with the nipples disposed in different planes as required.

Having thus fully described my invention, what I claim as new and desire to secure by Letters Patent is:—

1. The combination in an angular pipe joint of a nipple located at one end of the joint body and having an exterior tapered packing head, a complementary seat in the joint for said head, journal bearings in the joint for said nipple, said nipple having ports near its inner end opening to the interior of the joint body, a spring-head on the inner end of the nipple, a flanged nut closing the other end of the joint body and an adjusting disk in said nut, a spring interposed between the spring-head and said disk, and an adjusting bolt threaded through the nut and engaging said disk.

2. The combination in an angular pipe joint including a T-coupling, a bushing threaded in one end of the joint and a flanged nut closing the other end of the joint, a nipple having a journal bearing in the bushing, an integral packing head on the nipple engaging a complementary seat in the bushing, a journal-head on the nipple engaging a bearing of the bushing, a spring-head on the inner end of the nipple, an adjusting disk located in the flanged nut, a spring interposed between said disk and the spring-head, an adjusting bolt threaded in the nut and engaging the disk, and said nipple having a slotted portion affording communication with the interior of the joint-body.

3. The combination in a swivel pipe joint, of a nipple having a cylindrical portion journaled in one end of the joint-body, said portion having an exterior tapered packing-head and an inwardly spaced annular head, a journal bearing in the joint for said annular head and said parts forming a lubricating chamber about the nipple, said nipple having ports near its inner end opening to the interior of the joint-body, a tapered seat for the packing-head, a spring-head on the inner end of the nipple, a nut closing the other end of the joint-body, a spring interposed between said nut and the spring-head, and means for varying the compression of said spring.

CHIPMAN H. GIBERSON.